United States Patent
Sarno

(10) Patent No.: US 10,480,702 B1
(45) Date of Patent: Nov. 19, 2019

(54) PLASTIC UNION WITH INTEGRAL LOCKING STRUCTURE

(71) Applicant: Magic Plastics, Inc., Valencia, CA (US)

(72) Inventor: John Sarno, Valencia, CA (US)

(73) Assignee: Magic Plastics, Inc., Valencia, CA (US)

( * ) Notice: Subject to any disclaimer, the term of this patent is extended or adjusted under 35 U.S.C. 154(b) by 0 days.

(21) Appl. No.: 16/505,463

(22) Filed: Jul. 8, 2019

Related U.S. Application Data

(63) Continuation of application No. 15/836,698, filed on Dec. 8, 2017, now Pat. No. 10,393,304, which is a continuation-in-part of application No. 14/707,899, filed on May 8, 2015, now abandoned.

(51) Int. Cl.
*F16L 47/04* (2006.01)
*F16L 19/025* (2006.01)

(52) U.S. Cl.
CPC ............. *F16L 47/04* (2013.01); *F16L 19/025* (2013.01)

(58) Field of Classification Search
CPC .............................. F16L 47/04; F16L 19/025
USPC .................. 285/92–93, 354, 386, 387, 388
See application file for complete search history.

(56) References Cited

U.S. PATENT DOCUMENTS

| | | |
|---|---|---|
| 5,376,015 A | 12/1994 | Fuchs et al. |
| 5,702,374 A | 12/1997 | Johnson |
| 5,851,035 A | 12/1998 | Marc et al. |
| 7,156,424 B2 | 1/2007 | McCord |
| 7,390,033 B2 | 6/2008 | Weick et al. |
| 7,571,937 B2 | 8/2009 | Patel |
| 8,992,148 B2 | 3/2015 | Schafer et al. |

*Primary Examiner* — James M Hewitt, II
(74) *Attorney, Agent, or Firm* — James M. Duncan, Esq.; Klein DeNatale Goldner

(57) ABSTRACT

A plastic pipe union has an integral locking mechanism which is activated when nut member of the union is sufficiently tightened to the threads of an adjoining male nipple. The nut member and the tail piece of the plastic union each have matching engagement surfaces, where each engagement surface has a scalloped profile. Once sufficiently tightened, tactile feedback is provided to a personal manually tightening the nut member, indicating that the scalloped structures of the opposing engagement surfaces have interacted and reached a locked configuration.

16 Claims, 4 Drawing Sheets

PLASTIC UNION WITH INTEGRAL LOCKING STRUCTURE

RELATED APPLICATIONS

This is a continuation of U.S. patent application Ser. No. 15/836,698 filed on Dec. 8, 2017 to which application this inventor claims domestic priority.

BACKGROUND OF THE INVENTION

The present application generally relates to pipe fittings fabricated from plastic materials, and more specifically to pipe unions fabricated from plastic materials. Polyvinyl Chloride (PVC) is the most widely used plastic piping material. However other thermoplastic materials utilized for fabricating pipe and pipe fittings, including, but not limited to, Acrylonitrile-Butadiene-Styrene (ABS), Chlorinated Polyvinyl Chloride (CPVC), Polyethylene (PE), and Cross-Linked Polyethylene (PEX). When utilized herein, the term "plastic" is to be interpreted as to including all of these materials.

Among the fittings fabricated from plastic are pipe unions. Unions are designed to allow quick and convenient disconnection of pipes for assembly, maintenance and repair. In using a pipe union to connect two pipes or fittings together, the ends of the pipe or fittings are not connected to each other, but are instead connected to a third piece, the third piece being the union. When one of the pipes or fittings needs to come apart from the other, the nut of the union is unscrewed. A union thus allows easy connection or disconnection at any time.

A union is made in three parts which shall be referred to herein as a nut, a tail piece, and a male end, where the male end may be the end of a length of pipe, a fitting, or a threaded nipple extending from a valve, pump housing, or similar equipment, which are generally referred to herein as the "end device." The end device is connected into a piping system by attachment of male end to the tail piece by tightening of the nut. When the nut is unscrewed from the male end, the nut is free to move along a certain length of the tail piece, thereby allowing sufficient room to disconnect the end device from the piping system. When the tail piece and male end are joined, the nut provides the necessary pressure to seal the joint between the end device and the piping system.

In some cases, particularly where the end device vibrates or causes any torqueing of the male end, it is possible for the nut to work loose. For example, if the end device is a centrifugal pump with the male end on the suction side of the impeller housing, as typical for a home spa, the entire pump can be torqued by the starting and stopping of the pump motor, which can cause the nut to come loose, resulting in leakage at the union. It would therefore be desirable to have a plastic union which has integral features which prevent the nut from coming loose, even if the male end is subject to torqueing and vibration.

SUMMARY OF THE INVENTION

Embodiments of the apparatus disclosed herein provides a plastic union which has integral locking structure which reduce or eliminate the nut coming loose as a result of torqueing and vibration. An embodiment of the disclosed union attaches by a nut member to a male nipple extending from a device, such as a centrifugal pump. A tail piece of the union attaches to a piping system, such that the union facilitates the connection and disconnection of the device, such as a centrifugal pump, to a piping system.

The tail piece is configured as a cylindrical conduit having an interior and an exterior. The tail piece has a proximal end and a distal end, the two of which define a first central axis. The distal end of the tail piece is configured to attach to the piping system. The proximal end of the tail piece comprises a seating face which abuts and seals against a matching seal face at the end of the male nipple. A biasing means is disposed between the seating face of the tail piece and the matching seal face at the end of the male nipple. When compressed, the biasing means provides the load which maintains the locking engagement of the engagement faces of the tail piece and the nut member as described in further detail below.

Beginning at the proximal end of the tale piece and extending a relatively short length toward the distal end, the external diameter of the cylindrical conduit is larger than the external diameter of the remainder of the cylindrical conduit, with the transition from the large diameter section to the smaller diameter section defining an outer circumferential shoulder. By way of example, for a tail piece having a total length of 1.7 inches, the enlarged external diameter section of the cylindrical conduit may be approximately 2.34 inches while the smaller diameter section has an approximate external diameter of 2.21 inches. The enlarged diameter section may extend approximately 0.35 inches from the seating face to the outer circumferential shoulder.

The circumferential shoulder has as engagement surface which is perpendicular to the central axis defined by the proximate end and the distal end, where the engagement surface faces the distal end—i.e., generally facing toward the piping system. The engagement surface is a scalloped or undulating surface which comprises a sequence of sections having a raised profile adjacent to a section having a lowered profile (or "normal" profile), adjacent to another section having a raised profile, and so on. The inventors herein have found that an acceptable profile is one in which the scallops have a maximum height, with respect to the lowered profile, of 0.020 inches. The sections of maximum height may occur in 40-degree intervals over the 360 degrees of the circumferential shoulder, such that the circumferential shoulder may have approximately 9 sections having a raised profile, each of the 9 sections separated by a section having a lowered profile which may also occur in 40 degree intervals, such that a raised-lowered transition occurs in 20 degree increments.

The nut member, which is generally cylindrical with an opening there-through, has a device end which is immediately adjacent to the device and a piping system end which faces the piping system. A central axis is defined between the device end and the piping system end. The cylindrical nut member has internal threads configured to engage the external threads of the male nipple and which run through almost the entirety of the inside wall of the cylindrical nut member. As the nut member is made up onto the threads of the male nipple, the proximate end of the tail piece is disposed against the male nipple while the cylindrical nut member slides over the tail piece with the distal end of the tail piece extending through and outside of the cylindrical nut member for connection to the piping system.

The piping system end of the cylindrical nut member has an internal circumferential shoulder which has an engagement surface perpendicular to the central axis of the nut member. The engagement surface of the internal circumferential shoulder is in facing relation with the engagement surface of the external circumferential shoulder of the tail piece. The engagement surface of the internal circumferential shoulder generally matches that of the engagement surface of the external circumferential shoulder, which is a scalloped or undulating surface which comprises a sequence of sections having a raised profile adjacent to a section having a lowered profile, adjacent to another section having a raised profile, and so on.

When the facing engagement surfaces come into engaging contact with one another and the cylindrical nut member is tightened upon the threads of the male nipple, the biasing means disposed between the seating face of the tail piece and the matching seal face at the end of the male nipple is compressed, thereby imposing a load which is opposite to the load imposed by the tightening of the cylindrical nut member onto the threads of the male member. As a result, the scalloped surfaces of the facing engagement surfaces interact to where a raised section of one engagement surface is placed in a loaded abutment against a lowered section of the corresponding engagement surface. This loaded abutment causes the nut member to positively lock upon the threads of the male nipple, thereby preventing the nut member from being loosened by vibration or by torqueing of the end device.

The biasing means disposed between the proximal end of the tail piece and the seal face of the male nipple may comprise an elastomeric ring which is seated in a groove in the seating face of the tale piece. When the nut member is tightened onto the threads of the male nipple, the seal member is compressed between the opposing faces of the male nipple and the proximal end of the tail piece. Other biasing means may also be utilized, such as one or more spring coils, leaf springs, or spring plates which are loaded as the nut member is tightened upon the threads of the male member and thus exerting an outward force on the tail piece as the nut member is tightened.

DETAILED DESCRIPTION OF THE EMBODIMENTS

Figure 1:
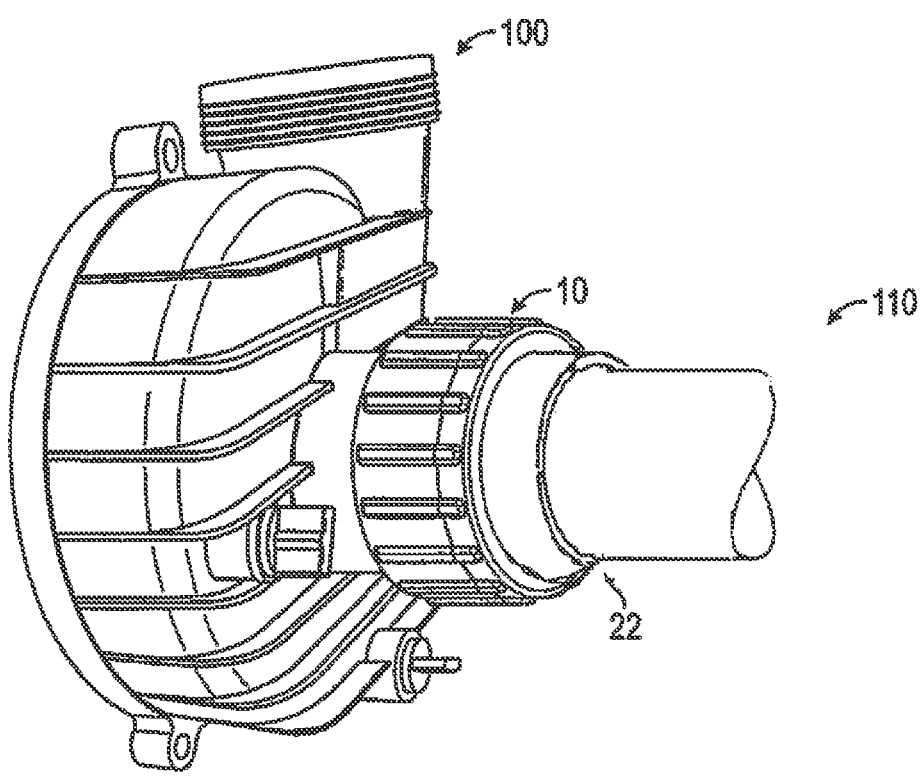
FIG. 1 depicts an end device, a portion of a centrifugal pump, which is connected to a piping system by an embodiment of the present locking union.
Figure 2:
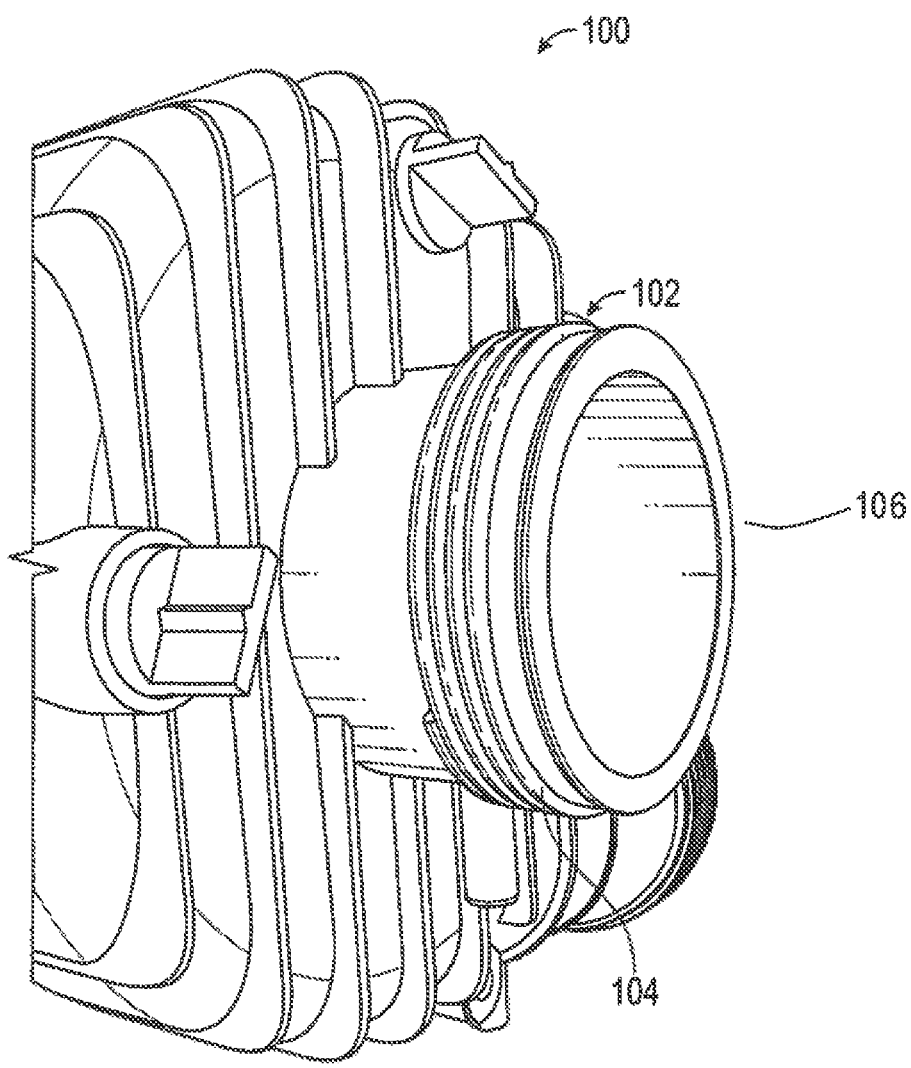
FIG. 2 shows an embodiment of a male nipple extending from an end device, in this case a portion of a centrifugal pump, which is used in combination with the locking

Referring specifically to the figures, FIG. 1 shows an embodiment of the disclosed locking union 10 which is used to connect a device 100, in this case a centrifugal pump, to a piping system 110. The device 100, whether centrifugal pump or other device such as a valve or fitting, comprises a male nipple 102 which extends outwardly from the device, as shown in FIG. 2. Male nipple 102 comprises external threads 104. The piping system 110 can be any continuation of piping which is connected to the device by the locking union 10, such as irrigation piping, nozzles for a hot tub or spa, or similar systems.

Figure 3:
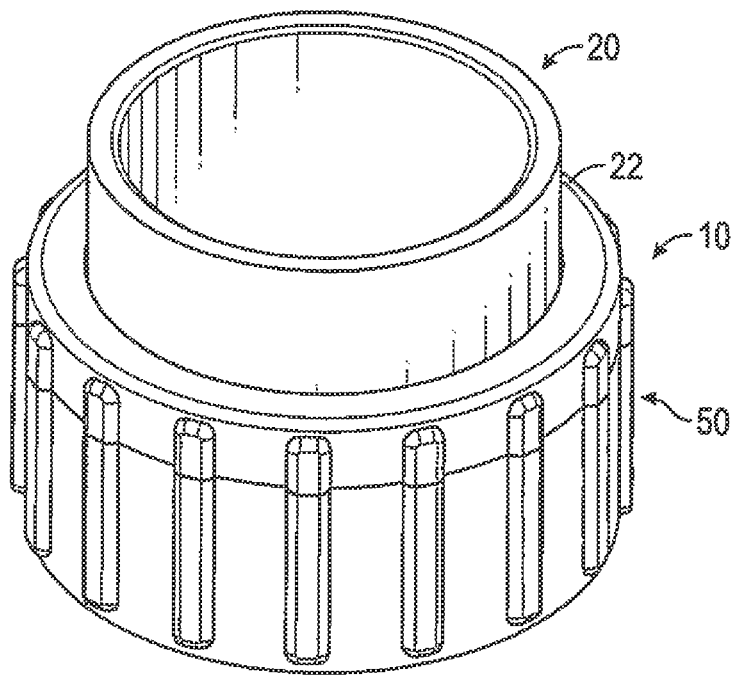
FIG. 3 depicts an embodiment of the present locking union.
Figure 4:
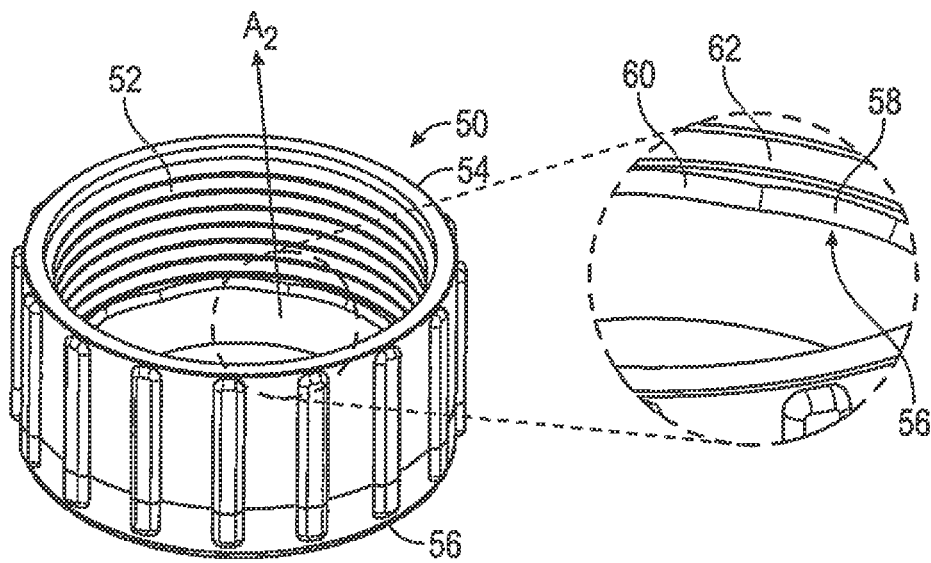
FIG. 4 depicts an embodiment of the cylindrical member of the present locking union, with the engagement surface of the internal circumferential shoulder shown in detail.

As best shown in FIG. 3, the locking union 10 comprises a tail piece 20 and a cylindrical nut member 50, which, but for the additional features described herein, function as pipe unions in the art, with tail piece 20 slidably received into cylindrical nut member 50, with a portion of the tail member, including the distal end 22, extending through an opening at the end of the cylindrical nut member 50 for attachment to the piping system 110. As shown in FIG. 4, cylindrical nut member 50 has internal threads 52 which make up to external threads 104 of male nipple 102.

Figure 5:
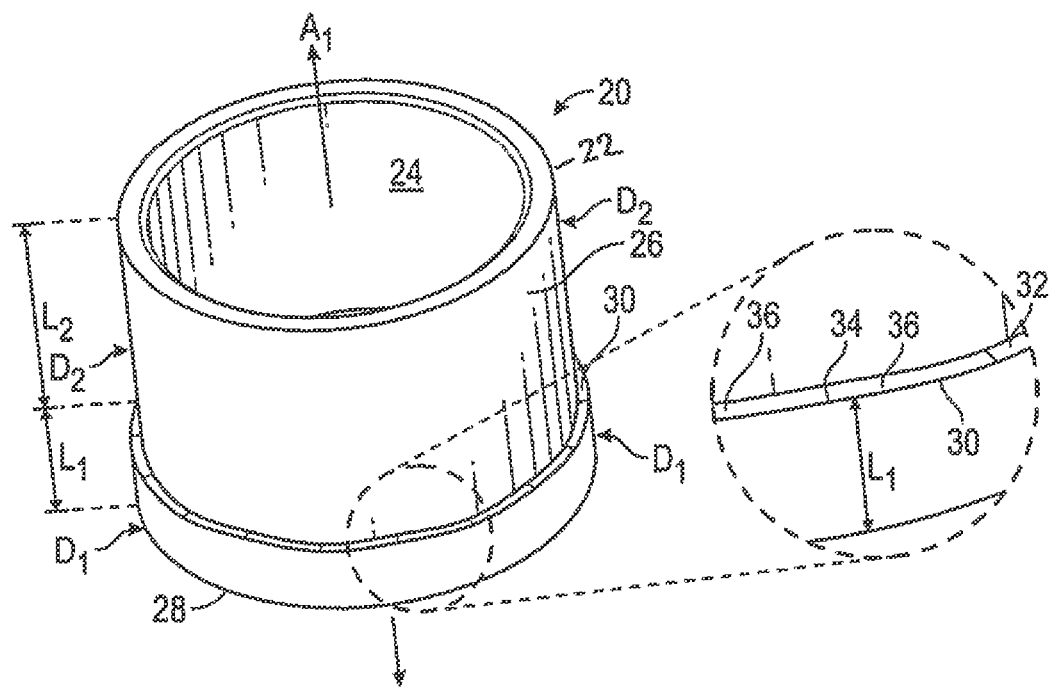
FIG. 5 depicts an embodiment of the tail piece of the present locking union with the engagement surface of the external circumferential shoulder shown in detail.

As shown in FIG. 5, tail piece 20 is configured as a cylindrical conduit which has an interior 24 and an exterior 26. Tail piece 20 has a distal end 22 which attaches to piping system 110 and a proximal end 28 which is brought into sealing contact with the outwardly sealing face 106 at the end of male pipe nipple 102 when the internal threads 52 of cylindrical nut member 50 are made up onto external threads 104. Distal end 22 and proximal end 28 define a first central axis $A_1$. As cylindrical nut member 50 is tightened upon external threads 104 of the male pipe member 102, a biasing means disposed between proximal end 28 of the tail piece 20 and outwardly sealing face 106 is compressed, such that as the threads are loaded by the tightening of the cylindrical nut member 50, the biasing means imposes an outward load against the tail piece 20.

Tail piece 20 comprises a first outer diameter $D_1$ which begins at the proximate end 28 and extends toward distal end 22 by a length $L_1$ without reaching distal end 22. Tail piece 20 further comprises a second outer diameter $D_2$ which extends a length $L_2$ to the distal end 22. Diameter $D_1$ is larger than diameter $D_2$ such that an outer circumferential shoulder 30 is defined by the transition from diameter D1 to diameter D2. Circumferential shoulder 30 has an engagement surface 32 which is perpendicular to first central axis A1. The engagement surface 32 of the outer circumferential shoulder 30 faces distal end 22. The engagement surface 32 has a sequence of undulations or scallops which are formed by a raised section 34 with a lowered section 36 on either side and vice versa. The inventors herein have found that an acceptable profile is one in which the scallops have a maximum height, with respect to the lowered profile, of 0.020 inches. The sections of maximum height may occur in 40-degree intervals over the 360 degrees of the circumferential shoulder, such that the circumferential shoulder may have approximately 9 sections having a raised profile, each of the 9 sections separated by a section having a lowered profile which may also occur in 40-degree intervals.

Cylindrical nut member 50 has a device end 54 and a piping system end 56, where a central axis $A_2$ is defined between the device end 54 and the piping system end 56. Cylindrical nut member 50 has internal threads 52 internal threads which are configured to engage the external threads 104 of the male nipple 102. Cylindrical nut member 50 is adapted to over the tail piece 20 as shown in FIG. 3 with the distal end 22 of the tail piece 20 extending outside of the cylindrical nut member 50 through the piping system end 54. Piping system end 54 of the cylindrical nut member 50 has an internal circumferential shoulder 56. Internal circumferential shoulder 56 has an engagement surface 58 which is perpendicular to central axis $A_2$. Engagement surface 58 of the cylindrical nut member 50 is in facing relation with the engagement surface 32 of the tail piece 20.

Engagement surface 58 of the cylindrical nut member 50 is configured to engage the engagement surface 32 of the tail piece 20, and thus has essentially the same profile. Engagement surface 58 has a sequence of undulations or scallops which are formed by a raised section 60 with a lowered section 62 on either side and vice versa. As with the profile of the tail piece 20, the engagement surface 58 of the cylindrical nut member may have a profile in which the scallops have a maximum height, with respect to the lowered profile, of 0.020 inches. The sections of maximum height may occur in 40-degree intervals over the 360 degrees of the internal circumferential shoulder 56 such that the internal circumferential shoulder may have approximately 9 sections having a raised profile, each of the 9 sections separated by a section having a lowered profile which may also occur in 40 degree intervals.

Figure 6:
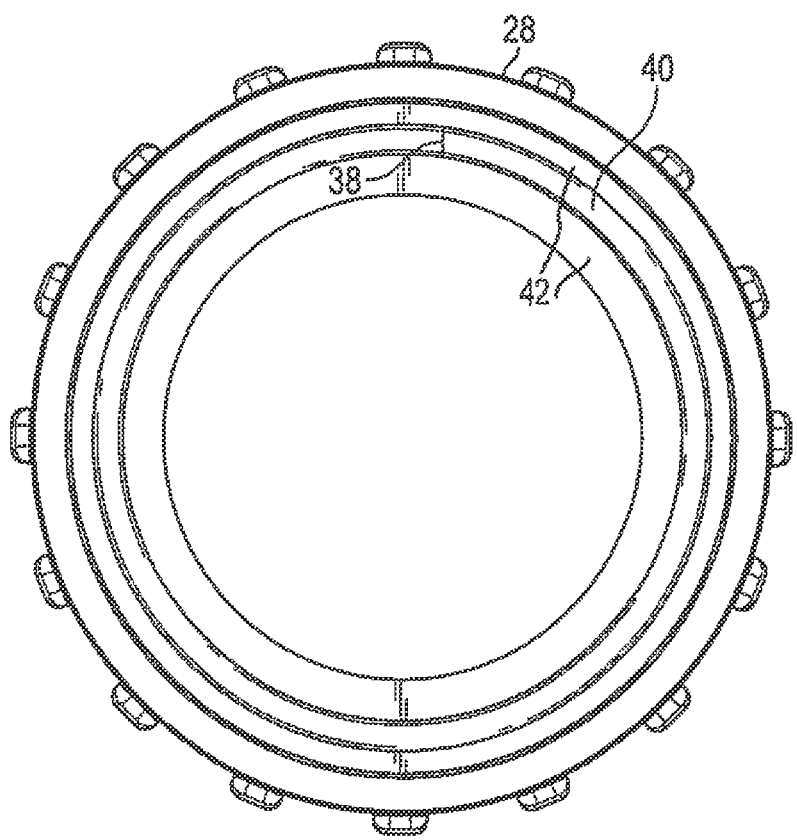
FIG. 6 shows an end view of an embodiment of the present locking union, viewed to show the proximal end of the tail piece.

Embodiments of the plastic pipe union 10 have a proximal end 28 of the tail piece 20 having a sealing face 42. Proximal end 28 may have a ring groove 38 with a seal member 40 disposed as shown in FIG. 6. Seal member 40, which is manufactured from elastomeric materials, is compressed as cylindrical nut member 50 is made up onto the threads 104 of the male nipple 102. When the nut member 50 is tightened onto the threads 104 of the male nipple 102, the seal member 40 is compressed between the sealing face 42 of the proximal end 28 and the outwardly sealing face 106 of the male nipple 102, generating an outward force against tail piece 20. Other biasing means aside from seal member 40 may also be utilized, such as one or more spring coils, leaf springs, or spring plates which are loaded as the nut member 50 is tightened upon the threads 104 of the male nipple 102, thus exerting an outward force on the tail piece as the nut member is tightened.

In making up the locking union 10, the cylindrical nut member 50 is made up onto the threads 104 of the male nipple 102, with the proximal end 28 for tail piece 20 brought into sealing contact with the end of male pipe nipple 102 and the distal end 22 extending out through the opening of cylindrical nut member 50. As the cylindrical nut member 50 is tightened, engagement surface 32 is brought into facing contact with engagement surface 58. The scalloped profiles of each engagement surface, which are fabricated from a plastic material which yields elastically, interact with one another. Once the scalloped profiles of each engagement surface are brought into facing contact, the compression of the biasing means between the sealing face 42 of the proximal end 28 and the outwardly sealing face 106 of the male nipple 102 causes the scalloped surfaces of the facing engagement surfaces to interact to where a raised section of one engagement surface is placed in a loaded abutment against a lowered section of the corresponding engagement surface. This loaded abutment causes the nut member 50 to be positively locked upon the threads of the male nipple 106, thereby preventing the nut member 50 from being loosened by vibration or by torqueing of the end device.

In manually tightening the cylindrical nut member, a user can feel a definitive "click" when a raised section 34 aligns with a lowered section 62 while the biasing means is applying an outward load on the tail piece 20. This tactile response provides the user with a definitive indication of when the cylindrical nut member is in a locked position.

While the above is a description of various embodiments of the present invention, further modifications may be employed without departing from the spirit and scope of the present invention. Thus, the scope of the invention should not be limited according to these factors, but according to the following appended claims:

What is claimed is:

1. A plastic pipe union for attaching a male nipple extending from a device to a piping system, the male nipple comprising external threads and an outwardly facing sealing face, the plastic pipe union comprising:
   a tail piece comprising a cylindrical conduit having a proximal end and a distal end, the proximal end comprising a proximal end sealing face which mates against the outwardly facing sealing face of the male nipple, the distal end configured to attach to the piping system;
   a biasing means disposed between the proximal end sealing face and the outwardly facing sealing face wherein the biasing means compresses as the proximal end sealing face seats against the outwardly facing sealing face of the male nipple;
   the tail piece comprising a first outer diameter beginning at the proximal end and extending a first length toward the distal end, the tail piece further comprising a second outer diameter extending a second length to the distal end, wherein the first outer diameter is larger than the second outer diameter, and an outer circumferential shoulder is defined by a transition from the first outer diameter to the second outer diameter;
   the outer circumferential shoulder having a longitudinally oriented first engagement surface facing the distal end, the longitudinally oriented first engagement surface comprising a first raised section and a first lowered section; and
   a cylindrical nut member having a device end and a piping system end, the cylindrical nut member comprising internal threads configured to engage the external threads of the male nipple, wherein the cylindrical nut member comprises an opening adapted to receive the tail piece with the distal end of the tail piece extending outside of the cylindrical nut member through the piping system end, the piping system end comprising an internal circumferential shoulder having a longitudinally oriented second engagement surface in facing relation with the longitudinally oriented first engagement surface, the longitudinally oriented second engagement surface comprising a second raised section and a second lowered section.

2. The plastic pipe union of claim 1 having a locked position when the internal threads of the nut member are made up onto the external threads of the male nipple and the proximal end sealing face seats against the outwardly facing sealing face thereby causing the longitudinally oriented first engagement surface to come into engaging contact with the longitudinally oriented second engagement surface, with the first raised section abutted against a second lowered section and a first lowered section abutted against a second raised section, and the biasing means compressed between the proximal end sealing face and the outwardly facing sealing face of the male nipple.

3. The plastic pipe union of claim 1 wherein the biasing means comprises an elastomeric seal ring seated within a ring groove on the proximal end.

4. The plastic pipe union of claim 1 wherein the longitudinally oriented first engagement surface comprises an alternating sequence of first raised sections and first lowered sections.

5. The plastic pipe union of claim 3 wherein the longitudinally oriented first engagement surface extends over 360 degrees and a maximum height of each first raised section occurs approximately every 40 degrees over the 360 degrees.

6. The plastic pipe union of claim 4 wherein the maximum height is approximately 0.020 inches.

7. The plastic pipe union of claim 1 wherein the device comprises a centrifugal pump.

8. The plastic pipe union of claim 2 wherein a tactile response is received by a user when the cylindrical nut member achieves the locked position.

9. A locking pipe union for attaching a male nipple extending from a device to a piping system, the male nipple comprising an outwardly facing sealing face, the locking pipe union comprising:
- a cylindrical tail piece comprising a conduit member extending from a proximal end to a distal end, the proximal end comprising a proximal end sealing face for engaging against the outwardly facing sealing face, the proximal end sealing face comprising an o-ring groove;
- an elastomeric o-ring disposed within the o-ring groove;
- the proximal end of the tail piece further comprising a circumferential shoulder comprising a first engagement surface facing the distal end and facing opposite the proximal facing sealing face, the first engagement surface comprising a first scalloped profile; and
- a nut member having a cylindrical opening extending from a first end to a second end, the cylindrical opening configured to receive the tail piece with the distal end of the tail piece extending outside of the second end, the second end comprising a second engagement surface facing the first end, the second engagement surface in facing relating with the first engagement surface, the second engagement surface comprising a second scalloped profile;

wherein the compression of the elastomeric o-ring between the outwardly facing sealing face and the proximal end sealing face biases the first engagement surface against the second engagement surface.

10. The locking pipe union of claim 9 wherein the first scalloped profile and the second scalloped profile each comprise a first raised section immediately adjacent to a first lowered section, the first raised section and first lowered section comprising a sequence.

11. The locking pipe union of claim 10 wherein the first engagement surface and the second engagement surface each comprise a plurality of end-to-end sequences.

12. The locking pipe union of claim 11 wherein the first engagement surface and the second engagement surface each extend over 360 degrees.

13. The locking pipe union of claim 12 wherein each raised section comprises a maximum height and the maximum height of each raised section occurs every 40 degrees over the 360 degrees.

14. The locking pipe union of claim 13 wherein the maximum height is approximately 0.020 inches.

15. The locking pipe union of claim 9 wherein the locking pipe union is placed in a locked position when the first engagement surface is biased against the second engagement surface.

16. The locking pipe union of claim 15 wherein a tactile response is received by a user when the locking pipe union is placed in a locked position.

* * * * *